(12) United States Patent
Nakagawa et al.

(10) Patent No.: US 8,939,865 B2
(45) Date of Patent: Jan. 27, 2015

(54) ROLLER BEARING

(75) Inventors: Tsutomu Nakagawa, Iwata (JP);
Masashi Nishimura, Iwata (JP); Shinji Oishi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/345,824

(22) PCT Filed: Aug. 30, 2012

(86) PCT No.: PCT/JP2012/071996
§ 371 (c)(1),
(2), (4) Date: Mar. 19, 2014

(87) PCT Pub. No.: WO2013/042521
PCT Pub. Date: Mar. 28, 2013

(65) Prior Publication Data
US 2014/0221150 A1    Aug. 7, 2014

(30) Foreign Application Priority Data

Sep. 22, 2011   (JP) ................................ 2011-207739

(51) Int. Cl.
*F16H 57/08*    (2006.01)
*F16C 33/46*    (2006.01)
(Continued)

(52) U.S. Cl.
CPC ............ *F16C 33/4605* (2013.01); *F16C 33/56* (2013.01); *F16C 33/4617* (2013.01); *F16C 33/4676* (2013.01); *F16C 33/6681* (2013.01);
(Continued)

(58) Field of Classification Search
USPC .................... 384/572, 575, 576; 475/331, 348
See application file for complete search history.

(56) References Cited

U.S. PATENT DOCUMENTS 5,584,583 A    12/1996   Hidano
6,857,785 B2 *  2/2005   Takahashi et al. ............ 384/572
(Continued)

FOREIGN PATENT DOCUMENTS

JP    7-167135    7/1995
JP    7-293569    11/1995
(Continued)

OTHER PUBLICATIONS

International Search Report issued Nov. 6, 2012 in International (PCT) Application No. PCT/JP2012/071996.
(Continued)

*Primary Examiner* — Justin Holmes
(74) *Attorney, Agent, or Firm* — Wenderoth, Lind & Ponack, LLP

(57) ABSTRACT

Surface indentation and oil film shortage on rollers is prevented and longer service life of a roller bearing is achieved, by preventing wear debris from being caught and accumulated in pockets of a holder of the roller bearing. Positions and dimensional relations of the diameters of inner and outer ring raceways, the inner and outer diameters of the holder, and inner and outer protrusions which are provided to pillar parts of the holder to prevent the rollers from coming off are defined such that the inner and outer protrusions of the pillar parts always do not come into contact with the outer circumferential surfaces of the rollers in the state where the rollers and the holder are incorporated between inner and outer members. As a result, lubricant oil is smoothly circulated in gaps formed between the outer circumferential surfaces of the rollers and the pillar parts of the holder.

10 Claims, 4 Drawing Sheets

(51) Int. Cl.
- *F16C 33/56* (2006.01)
- *F16C 33/66* (2006.01)
- *F16H 1/28* (2006.01)
- *F16C 19/26* (2006.01)

(52) U.S. Cl.
CPC . *F16H 1/28* (2013.01); *F16C 19/26* (2013.01); *F16C 2240/46* (2013.01); *F16C 33/4629* (2013.01); *F16C 33/4635* (2013.01); *F16H 2057/085* (2013.01); *F16C 2361/61* (2013.01)
USPC ............................ 475/331; 384/572; 384/580

(56) References Cited

U.S. PATENT DOCUMENTS

| | | | |
|---|---|---|---|
| 8,322,931 B2* | 12/2012 | Urakami et al. | 384/580 |
| 2010/0129021 A1* | 5/2010 | Egami et al. | 384/572 |
| 2011/0064349 A1* | 3/2011 | Braun | 384/572 |
| 2011/0142389 A1* | 6/2011 | Takeuchi et al. | 384/572 |
| 2011/0212808 A1* | 9/2011 | Pabst | 475/348 |

FOREIGN PATENT DOCUMENTS

| | | |
|---|---|---|
| JP | 8-184320 | 7/1996 |
| JP | 2005-195142 | 7/2005 |
| JP | 2006-112584 | 4/2006 |
| JP | 2008-45711 | 2/2008 |
| JP | 2008-196589 | 8/2008 |
| JP | 2011-117495 | 6/2011 |

OTHER PUBLICATIONS

Form PCT/IB/345 and PCT Third Party Observation issued Jan. 21, 2014 in International (PCT) Application No. PCT/JP2012/071996.
International Preliminary Report on Patentability and Written Opinion of the International Searching Authority issued Apr. 3, 2014 in International (PCT) Application No. PCT/JP2012/071996.

* cited by examiner

ROLLER BEARING

TECHNICAL FIELD

The present invention relates to a roller bearing suitably used for a planetary gear reducer.

BACKGROUND ART

As illustrated in FIG. 5 to FIG. 7, a roller bearing 21 includes: an outer member 23 having a cylindrical outer ring raceway 22 on its inner circumferential surface; an inner member 25 having a cylindrical inner ring raceway 24 on its outer circumferential surface; and a plurality of rollers 26 that are rollably provided between the outer ring raceway 22 and the inner ring raceway 24.

The rollers 26 are rollably held by a holder 27 the entirety of which is formed in a cylindrical shape. The holder 27 has pockets 28 that respectively house the rollers 26, at predetermined intervals in its circumferential direction. The holder 27 includes: pillar parts 29 between the pockets 28 adjacent to each other in the circumferential direction; and annular parts 30 on both sides in the axial direction of the pillar parts 29.

Inner protrusions 31 and outer protrusions 32 that prevent the rollers 26 from coming off are respectively provided on the inner diameter side and the outer diameter side of the pillar parts 29 of the holder 27.

Oil channels 33A and 33B that extend inward and outward in the radial direction are provided in, for example, three portions of a middle portion and both ends in the axial direction of each pillar part 29 so as not to overlap with portions in which the inner protrusions 31 and the outer protrusions 32 are formed. Then, lubricant oil is centrifugally circulated from the inside to the outside in the radial direction of the holder 27 through the oil channels 33A and 33B, whereby a flow of the lubricant oil and the amount of lubricant oil in the roller bearing 21 are secured.

The roller bearing 21 configured as described above is used for, for example, the case where a planetary gear (outer member 23) is pivotally supported by a support pin (inner member 25) in each reducing gear mechanism of a planetary gear reducer.

In such a case, the gap formed between the outer member 23 and the holder 27 defines an outer oil passage 34, the gap formed between the inner member 25 and the holder 27 defines an inner oil passage 35, and the lubricant oil in a housing that constitutes the outer shape of the planetary gear reducer passes through the outer oil passage 34 and the inner oil passage 35 to flow into each pocket 28 of the roller bearing 21. Then, the lubricant oil that has flown thereinto is circulated by centrifugal force generated by rotation of the planetary gear, from the inside to the outside in the radial direction of the holder 27 through the oil channels 33A and 33B. This enhances the lubricity of the roller bearing 21.

Meanwhile, in the case where the roller bearing 21 is used for such a planetary gear reducer as described above, dusts such as wear debris and seal pieces of a seal member are generated from mesh surfaces of gears during operation, and the dusts invade each pocket 28 of the roller bearing 21 along with the flow of the lubricant oil.

The inner protrusions 31 and the outer protrusions 32 that prevent the rollers 26 from coming off are provided to the pillar parts 29 that respectively partition the pockets 28 of the roller bearing 21.

Accordingly, if each roller 26 rotates in contact with the inner protrusions 31 and the outer protrusions 32 of each pillar part 29, the lubricant oil on the outer surface of the roller 26 is scraped by the inner protrusions 31 and the outer protrusions 32, and the dusts are accumulated in contact portions between: the roller 26; and the inner protrusions 31 and the outer protrusions 32.

As a result, there occurs a problem that the roller 26 in each pocket 28 rubs against the dusts, particularly metal wear debris such as iron powder accumulated in portions of the inner protrusions 31 and the outer protrusions 32, and thus is worn away in a short time.

Particularly in recent years, for example, gear reducer manufacturers tend to omit finish processing of gears along with demands for cost reduction, so that the surface roughness is increasing. As a result, rough protrusions come off due to mesh between the gears, and a large amount of wear debris is generated in many cases. Accordingly, preventing rollers from being worn by metal wear debris is becoming an important issue.

As a countermeasure against such wear debris, Patent Literature 1 and Patent Literature 2 describe that a groove 36 that captures foreign substances and wear debris is provided on a wall surface of each pillar part 29 between the pockets 28.

CITATION LIST

Patent Literature

Patent Literature 1: Japanese Patent Laid-Open No. H08-184320 A
Patent Literature 2: Japanese Patent Laid-Open No. 2006-112584 A

SUMMARY OF INVENTION

Technical Problem

Unfortunately, even if the groove 36 is provided on the wall surface of each pocket 28 in order to capture foreign substances and wear debris as described above, the wear debris is still caught between the opening end edge of the groove 36 and the roller, and hence there occurs a problem that the roller is damaged by the caught wear debris in a short time.

In view of the above, the present invention has an object to avoid occurrence of surface indentation and oil film shortage on rollers and thus achieve a longer service life of a roller bearing, by preventing wear debris from being caught between: the rollers; and inner protrusions and outer protrusions of pillar parts of a holder and preventing the wear debris from being accumulated in pockets of the holder, even in a use portion in which a large amount of wear debris exists.

Solution to Problem

In order to achieve the above-mentioned object, the present invention provides a roller bearing including: an outer member having a cylindrical outer ring raceway on an inner circumferential surface thereof; an inner member having a cylindrical inner ring raceway on an outer circumferential surface thereof; a plurality of rollers that are rollably provided between the outer ring raceway and the inner ring raceway; and a holder that holds the rollers at predetermined intervals in a circumferential direction thereof. An entirety of the holder is formed in a cylindrical shape. The holder has pockets that respectively house the rollers, at predetermined intervals in the circumferential direction. The holder includes: pillar parts between the pockets adjacent to each other in the circumferential direction; and annular parts on both sides in an axial direction of the pillar parts. Inner protrusions and outer protrusions that prevent the rollers from coming off are respectively provided on an inner diameter side and an outer diameter side on both the sides in the axial direction of the pillar parts. Positions and dimensional relations of an outer ring raceway diameter, an inner ring raceway diameter, inner and outer diameters of the holder, and the inner protrusions and the outer protrusions of the pillar parts are defined such that a non-contact state is kept between: outer circumferential surfaces of the rollers; and the inner protrusions and the outer protrusions provided to the pillar parts in a state where the rollers and the holder are incorporated between the outer ring raceway diameter and the inner ring raceway diameter.

As described above, in order to keep the non-contact state between: the outer circumferential surfaces of the rollers; and the inner protrusions and the outer protrusions provided to the pillar parts in the state where the rollers and the holder are incorporated between the outer ring raceway diameter and the inner ring raceway diameter, the positions and dimensional relations of the outer ring raceway diameter, the inner ring raceway diameter, the inner and outer diameters of the holder, and the inner protrusions and the outer protrusions of the pillar parts are defined in the following manner.

That is, relations of A−B=C, G−F=H, D>C, E>C, C≠0, and H≠0 are satisfied assuming that: the outer ring raceway diameter is A; an outer diameter size of the holder is B; the inner ring raceway diameter is F; an inner diameter size of the holder is G; a gap in the circumferential direction between each roller and each pillar part in a state where the roller is located in a pocket center is L; a smallest gap between each outer protrusion and each roller when L=0 is D; and a smallest gap between each inner protrusion and each roller when L=0 is E.

It is desirable that a gap interval of an inner oil passage formed between the inner ring raceway and the inner diameter of the holder be set to be larger than a gap interval of an outer oil passage formed between the outer ring raceway and the outer diameter of the holder.

The holder is formed using a resin material or an iron material.

Examples of the usable resin material include polyamide 66, polyamide 46, polyether ether ketone, polyphenylene sulfide and the like, and the resin material may be fiber-reinforced using glass fibers.

The roller bearing according to the present invention can be used for a planetary gear reducer. In this case, the outer member is used as a planetary gear, and the inner member is used as a support pin.

Advantageous Effects of Invention

According to the roller bearing of the present invention, in the state where the rollers and the holder are incorporated between the outer ring raceway diameter and the inner ring raceway diameter, the non-contact state is kept between: the outer circumferential surfaces of the rollers; and the inner protrusions and the outer protrusions provided to the pillar parts. Hence, lubricant oil on the outer surfaces of the rollers is not scraped by the inner protrusions and the outer protrusions, and wear debris is not caught therebetween. Moreover, dusts such as metal wear debris mixed in the lubricant oil are not accumulated in portions of the inner protrusions and the outer protrusions, and the lubricant oil smoothly flows in the gaps between the rollers and the pockets.

Accordingly, in the roller bearing of the present invention, surface indentation and oil film shortage are less likely to occur in the rollers. Hence, even if the roller bearing is used for a planetary gear reducer in which metal wear debris is likely to occur, the service life thereof is longer.

Moreover, the gap interval of the inner oil passage formed between the inner ring raceway and the inner diameter of the holder is set to be larger than the gap interval of the outer oil passage formed between the outer ring raceway and the outer diameter of the holder. Hence, a larger amount of lubricant oil is circulated from the inner oil passage to the outer oil passage, and a cooling effect is improved.

DESCRIPTION OF EMBODIMENTS

Figure 1:
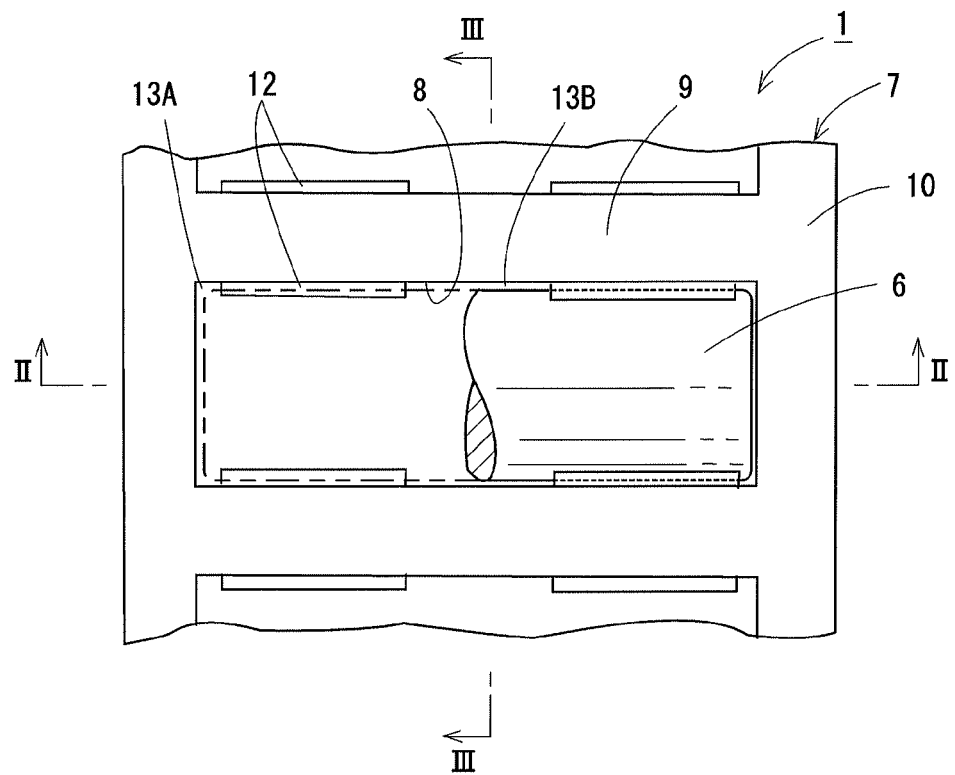
FIG. 1 is a plan view partially illustrating an embodiment of a roller bearing according to the present invention.
Figure 2:
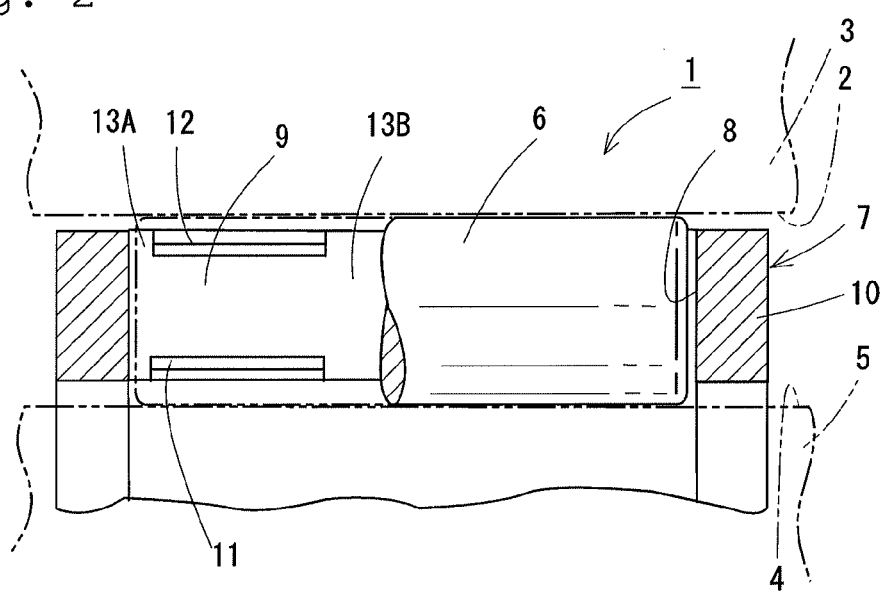
FIG. 2 is a cross sectional view taken along a line II-II in FIG. 1.

An embodiment of the present invention is described with reference to FIG. 1 to FIG. 4.

A roller bearing 1 includes: an outer member 3 having a cylindrical outer ring raceway 2 on its inner circumferential surface; an inner member 5 having a cylindrical inner ring raceway 4 on its outer circumferential surface; and a plurality of rollers 6 that are rollably provided between the outer ring raceway 2 and the inner ring raceway 4.

The rollers 6 are each formed in a cylindrical shape using a metal material or the like, are configured as needle rollers, bar rollers, or the like, and are regularly arranged in and held by a holder 7 the entirety of which is formed in a cylindrical shape.

The holder 7 has rectangular pockets 8 that respectively regularly house the rollers 6, at predetermined intervals in its circumferential direction, and is formed by injection molding or the like using a resin material. The pockets 8 are formed so as to penetrate through the holder 7 from the inner diameter side to the outer diameter side. The holder 7 includes: pillar parts 9 between the pockets 8 adjacent to each other in the circumferential direction; and annular parts 10 on both sides in the axial direction of the pillar parts 9.

Examples of the resin material used to form the holder 7 include polyamide 66, polyamide 46, polyether ether ketone, polyphenylene sulfide and the like, and the resin material may be fiber-reinforced using glass fibers or carbon fibers. Moreover, a lubricity improver, a spherical filler, and the like for improving sliding characteristics may be further added within a range in which characteristics of the holder are not adversely influenced.

Inner protrusions 11 and outer protrusions 12 that prevent the rollers 6 from coming off are respectively provided on the inner diameter side and the outer diameter side on both sides in the axial direction of the pillar parts 9 of the holder 7.

Oil channels 13A and 13B that extend inward and outward in the radial direction are provided in three portions of a middle portion and both ends in the axial direction of each pillar part 9 so as not to overlap with portions in which the inner protrusions 11 and the outer protrusions 12 are formed. Then, lubricant oil is centrifugally circulated from the inside to the outside in the radial direction of the holder 7 through the oil channels 13A and 13B, whereby a flow of the lubricant oil and the amount of lubricant oil in the roller bearing 1 are secured.

According to the present invention, positions and dimensional relations of the diameter of the outer ring raceway 2, the diameter of the inner ring raceway 4, the inner and outer diameters of the holder 7, and the inner protrusions 11 and the outer protrusions 12 of the pillar parts 9 are defined in the following manner such that the inner protrusions 11 and the outer protrusions 12 provided to the pillar parts 9 of the holder 7 always do not come into contact with the outer circumferential surfaces of the rollers 6 in the state where the rollers 6 and the holder 7 are incorporated between the outer member 3 and the inner member 5.

Figure 3:
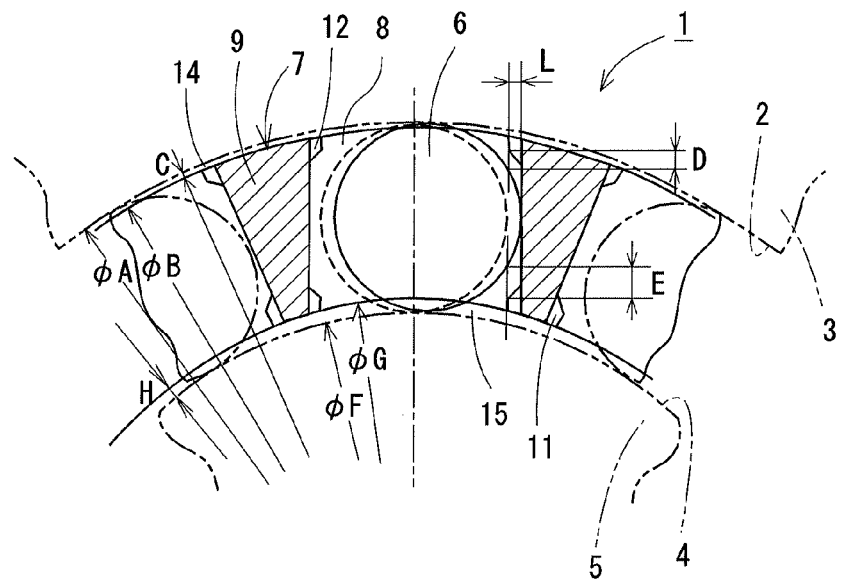
FIG. 3 is a cross sectional view taken along a line in FIG. 1.
Figure 4:
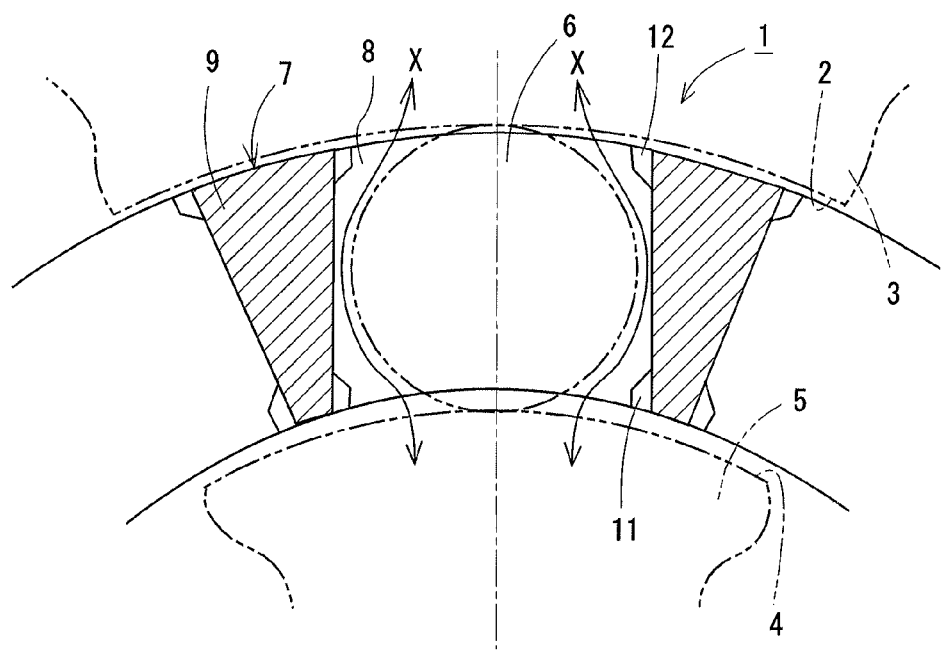
FIG. 4 is an enlarged cross sectional view illustrating a flow of lubricant oil in the roller bearing according to the present invention.
Figure 5:
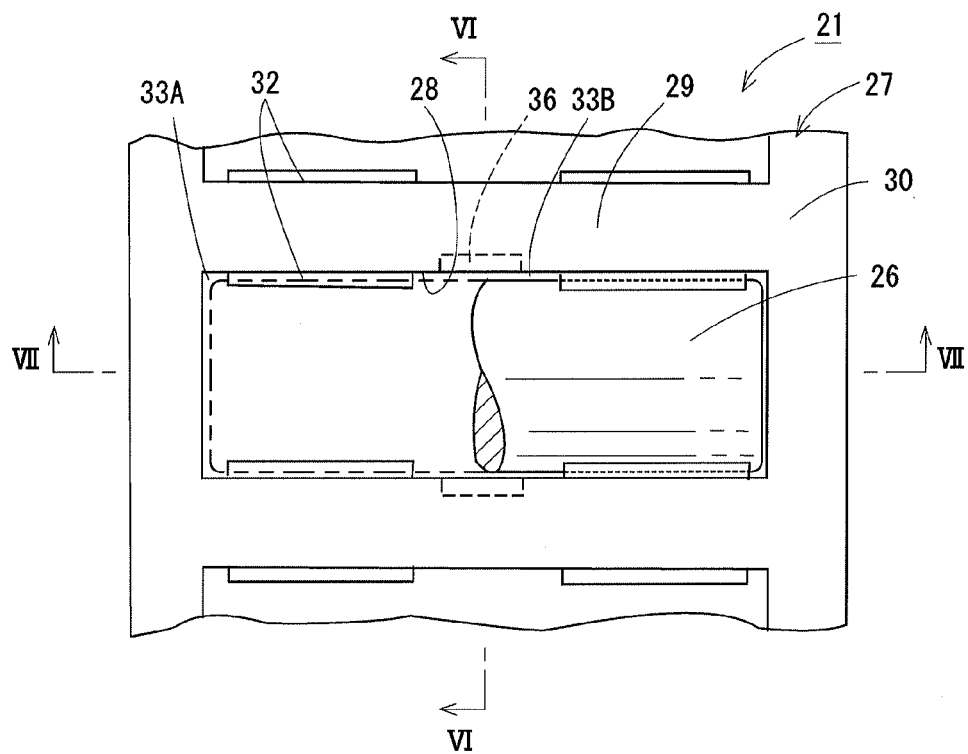
FIG. 5 is a plan view partially illustrating a conventional roller bearing.
Figure 6:
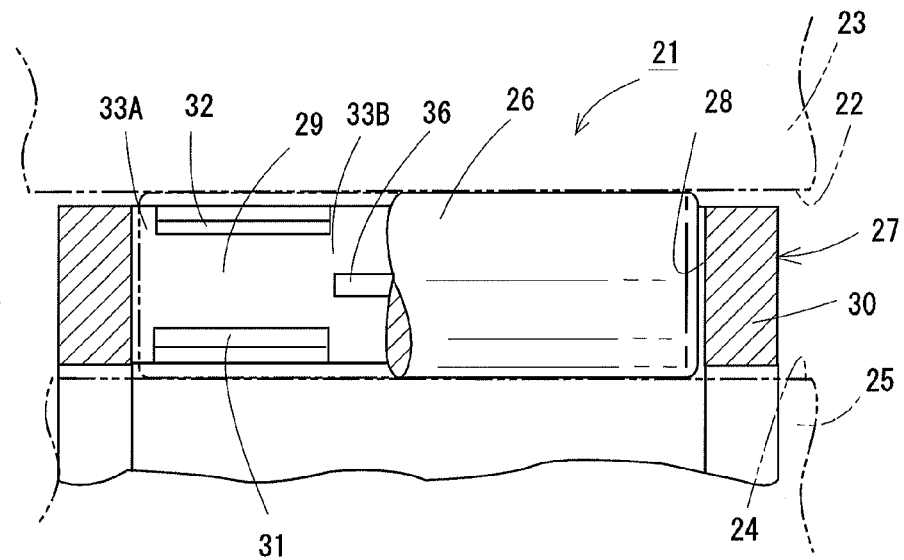
FIG. 6 is a cross sectional view taken along a line VI-VI in FIG. 5.
Figure 7:
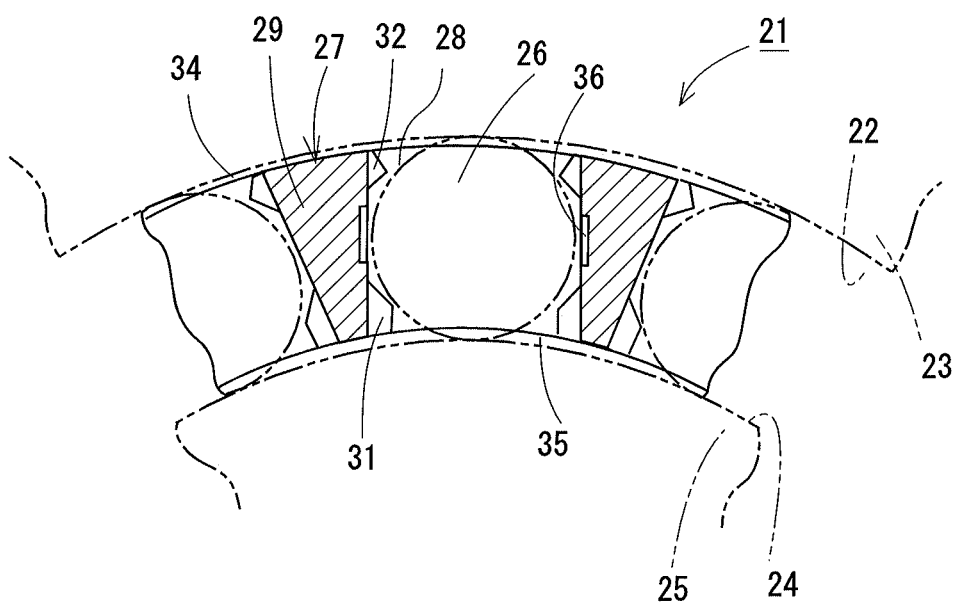
FIG. 7 is a cross sectional view taken along a line VII-VII in FIG. 5.

That is, as illustrated in FIG. 3, it is assumed that: the diameter of the outer ring raceway 2 is A; the outer diameter size of the holder 7 is B; the diameter of the inner ring raceway 4 is F; the inner diameter size of the holder 7 is G; and the gap in the circumferential direction between the roller 6 and the pillar part 9 is L. It is also assumed that: the smallest gap between the outer protrusion 12 and the roller 6 when L=0 is D; and the smallest gap between the inner protrusion 11 and the roller 6 when L=0 is E. In this case, relations of A−B=C, G−F=H, D>C, E>C, C≠0, and H≠0 are satisfied.

Under these conditions, in the state where the rollers 6 and the holder 7 are incorporated between the outer member 3 and the inner member 5, the inner protrusions 11 and the outer protrusions 12 provided to the pillar parts 9 of the holder 7 always do not come into contact with the outer circumferential surfaces of the rollers 6. Hence, as indicated by arrows X in FIG. 4, the lubricant oil is smoothly circulated in the gap between the outer circumferential surface of each roller 6 and each pillar part 9 of the holder 7, and the lubricant oil on the outer surface of the roller 6 is not scraped by the inner protrusions 11 and the outer protrusions 12. Moreover, dusts such as metal wear debris mixed in the lubricant oil are not accumulated in portions of the inner protrusions 11 and the outer protrusions 12.

In the embodiment illustrated in FIG. 1 to FIG. 4, the gap interval of an inner oil passage 15 formed between the inner ring raceway 4 and the inner diameter of the holder 7 is set to be larger than the gap interval of an outer oil passage 14 formed between the outer ring raceway 2 and the outer diameter of the holder 7.

As a result, a larger amount of lubricant oil is circulated from the inner oil passage 15 to the outer oil passage 14, and a cooling effect of the lubricant oil is improved.

Industrial Applicability

The roller bearing 1 according to the present invention is used for, for example, the case where a planetary gear (outer member 3) is pivotally supported by a support pin (inner member 5) in each reducing gear mechanism of a planetary gear reducer.

In such a case, the gap formed between the outer member 3 and the holder 7 defines the outer oil passage 14, the gap formed between the inner member 5 and the holder 7 defines the inner oil passage 15, and the lubricant oil in a housing that constitutes the outer shape of the planetary gear reducer passes through the outer oil passage 14 and the inner oil passage 15 to flow into the roller bearing 1. Then, the lubricant oil that has flown thereinto is circulated by centrifugal force generated by rotation of the planetary gear, from the inside to the outside in the radial direction of the holder 7 through the oil channels 13A and 13B. This enhances the lubricity of the roller bearing 1.

Reference Signs List 1 roller bearing
2 outer ring raceway
3 outer member
4 inner ring raceway
5 inner member
6 roller
7 holder
8 pocket
9 pillar part
10 annular part
11 inner protrusion
12 outer protrusion
13A oil channel
13B oil channel
14 outer oil passage
15 inner oil passage

The invention claimed is:

1. A roller bearing comprising:
an outer member having a cylindrical outer ring raceway on an inner circumferential surface thereof;
an inner member having a cylindrical inner ring raceway on an outer circumferential surface thereof;
a plurality of rollers that are rollably provided between the outer ring raceway and the inner ring raceway;
a holder that holds the rollers at predetermined intervals in a circumferential direction thereof, wherein an entirety of the holder is formed in a cylindrical shape, the holder has pockets that respectively house the rollers, at predetermined intervals in the circumferential direction, and the holder includes: pillar parts between the pockets adjacent to each other in the circumferential direction, and annular parts on both sides in an axial direction of the pillar parts;
inner protrusions on an inner diameter side on both sides in the axial direction of the pillar parts, wherein the inner protrusions have a size and location that prevents the rollers from coming off the holder; and
outer protrusions on an outer diameter side on both the sides in the axial direction of the pillar parts, wherein the outer protrusions have a size and location that prevents the rollers from coming off the holder;
wherein the holder with the rollers therein is located between the outer ring raceway and the inner ring raceway, and the inner protrusions and the outer protrusions on the pillar parts do not contact the rollers.

2. The roller bearing according to claim 1, wherein the following expressions are satisfied assuming that: an outer ring raceway diameter is A; an outer diameter size of the holder is B; an inner ring raceway diameter is F; an inner diameter size of the holder is G; a gap in the circumferential direction between each roller and each pillar part in a state where the roller is located in a pocket center is L; a smallest gap between each outer protrusion and each roller when L=0 is D; and a smallest gap between each inner protrusion and each roller when L=0 is E:

A−B=C, G−F=H, D>C, E>C, C≠0, and H≠0.

3. The roller bearing according to claim 1, wherein a gap interval of an inner oil passage formed between the inner ring raceway and the inner diameter of the holder is larger than a gap interval of an outer oil passage formed between the outer ring raceway and the outer diameter of the holder.

4. The roller bearing according to claim 1, wherein a material of the holder is an iron material.

5. A planetary gear reducer comprising the roller bearing according to claim 1.

6. The planetary gear reducer according to claim 5, wherein the outer member is a planetary gear, and the inner member is a support pin.

7. The roller bearing according to claim 1, wherein a material of the holder is a resin material.

8. The roller bearing according to claim 7, wherein the resin material is polyether ether ketone or polyphenylene sulfide.

9. The roller bearing according to claim 7, wherein the resin material is polyamide 66 or polyamide 46.

10. The roller bearing according to claim 9, wherein the resin material is fiber-reinforced using glass fibers or carbon fibers.

* * * * *